Figure 1:
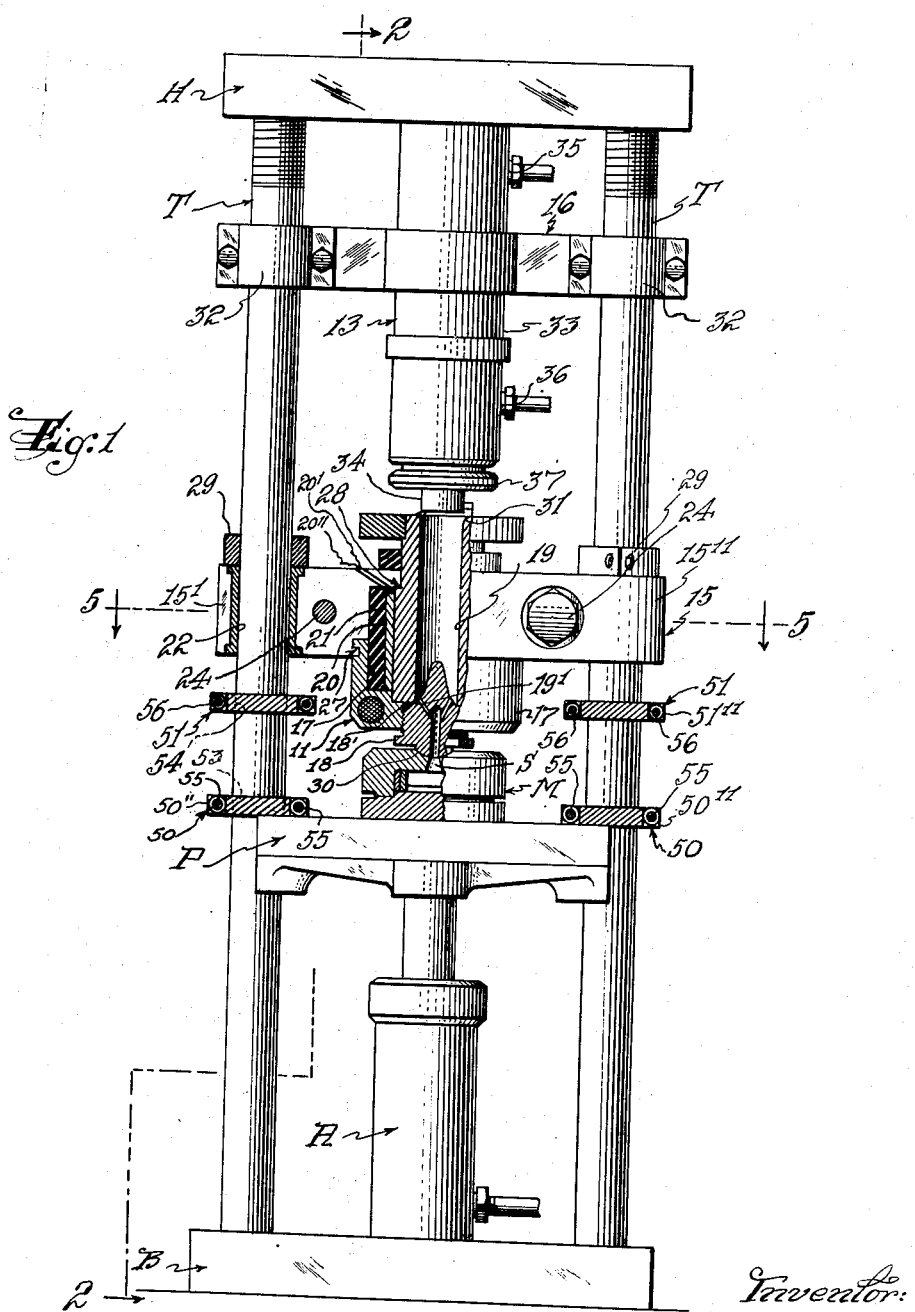

April 27, 1954

J. F. SHANNON
PLASTIC MOLDING CONVERSION ATTACHMENT FOR RECIPROCATING PRESSES

Filed Feb. 28, 1952

2,676,357

4 Sheets-Sheet 1

Inventor:
James F. Shannon
BY Dudley B. Howard
Attorney.

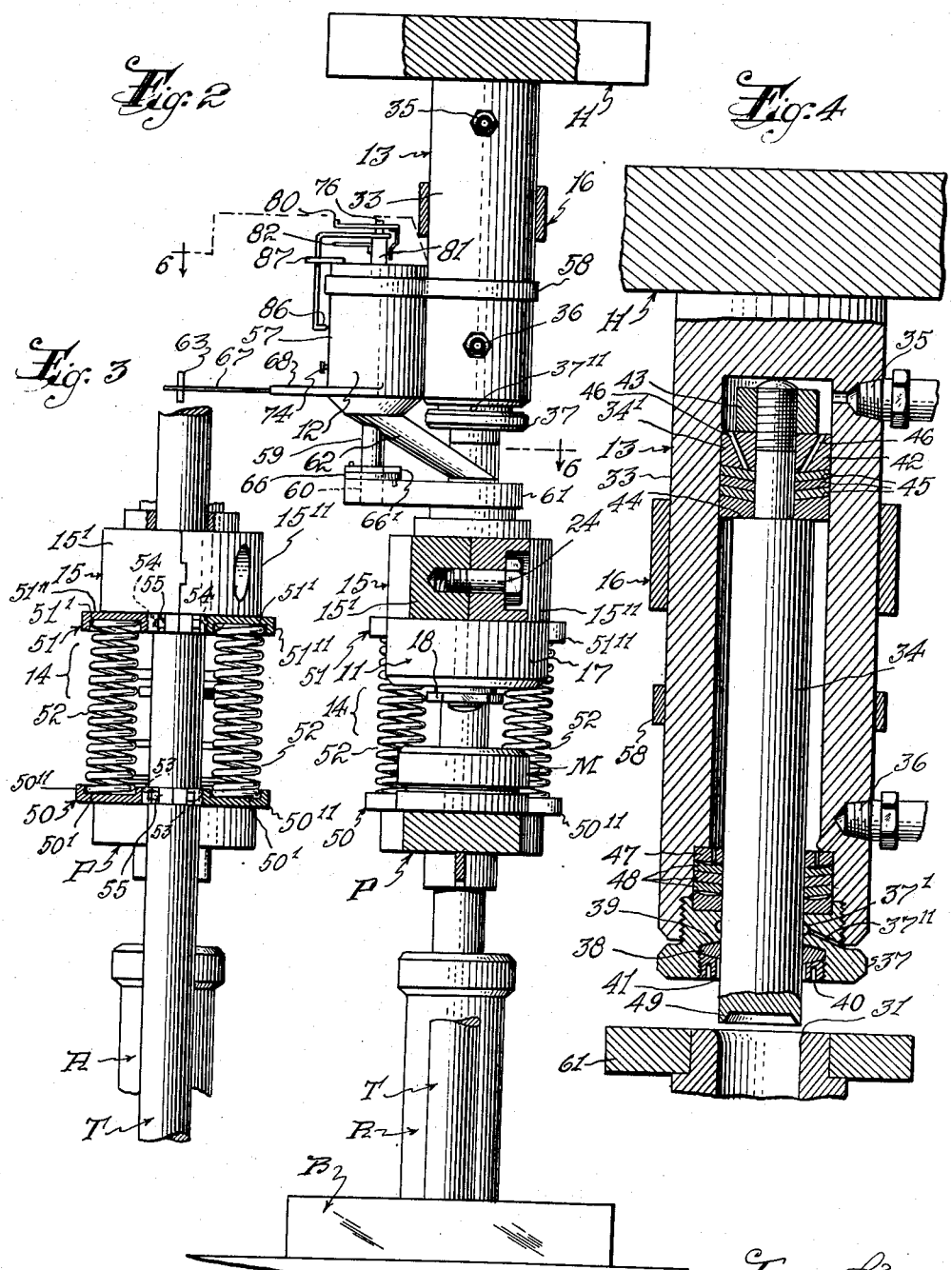

April 27, 1954
J. F. SHANNON
2,676,357
PLASTIC MOLDING CONVERSION ATTACHMENT
FOR RECIPROCATING PRESSES
Filed Feb. 28, 1952
4 Sheets-Sheet 3
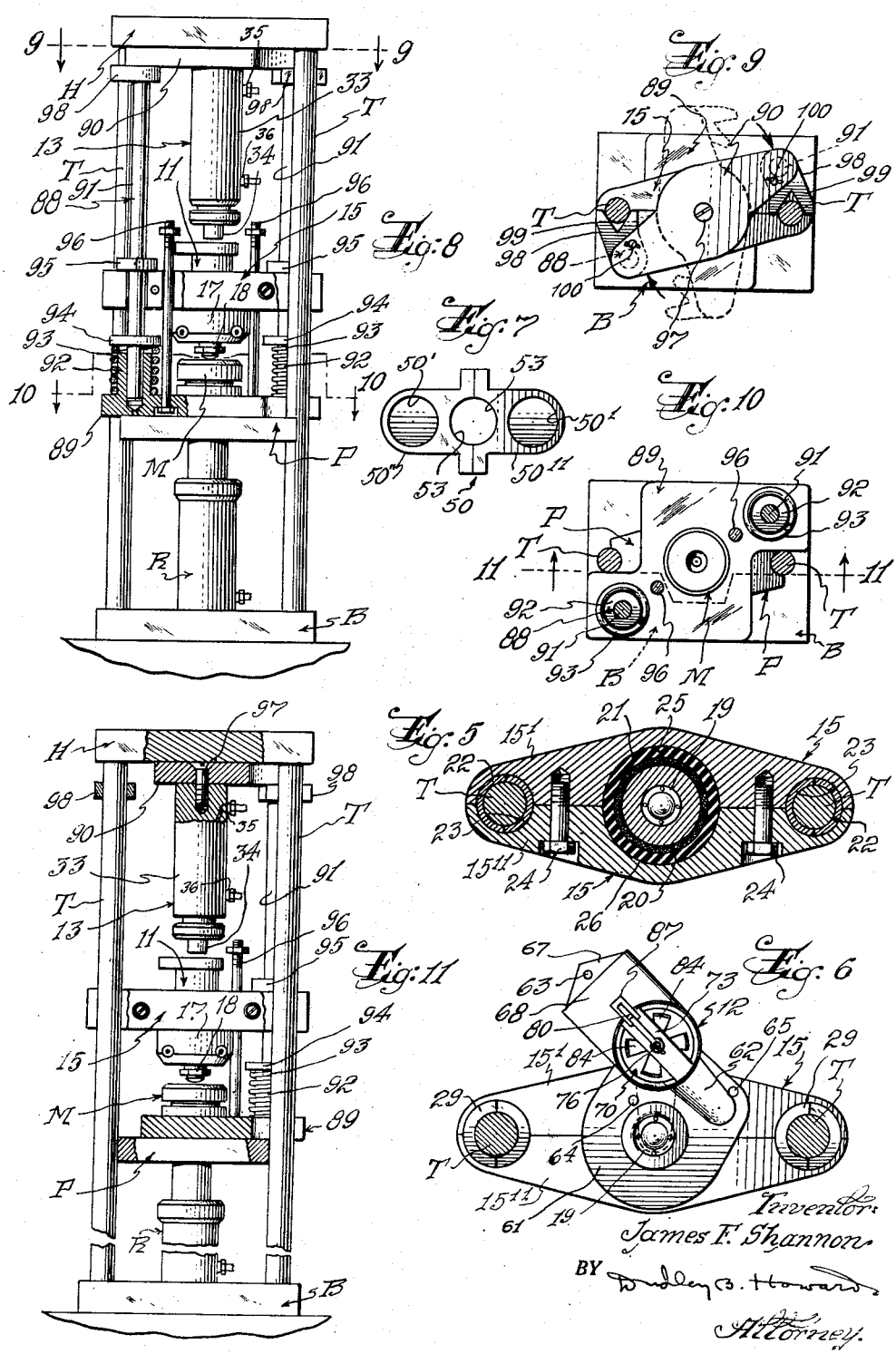

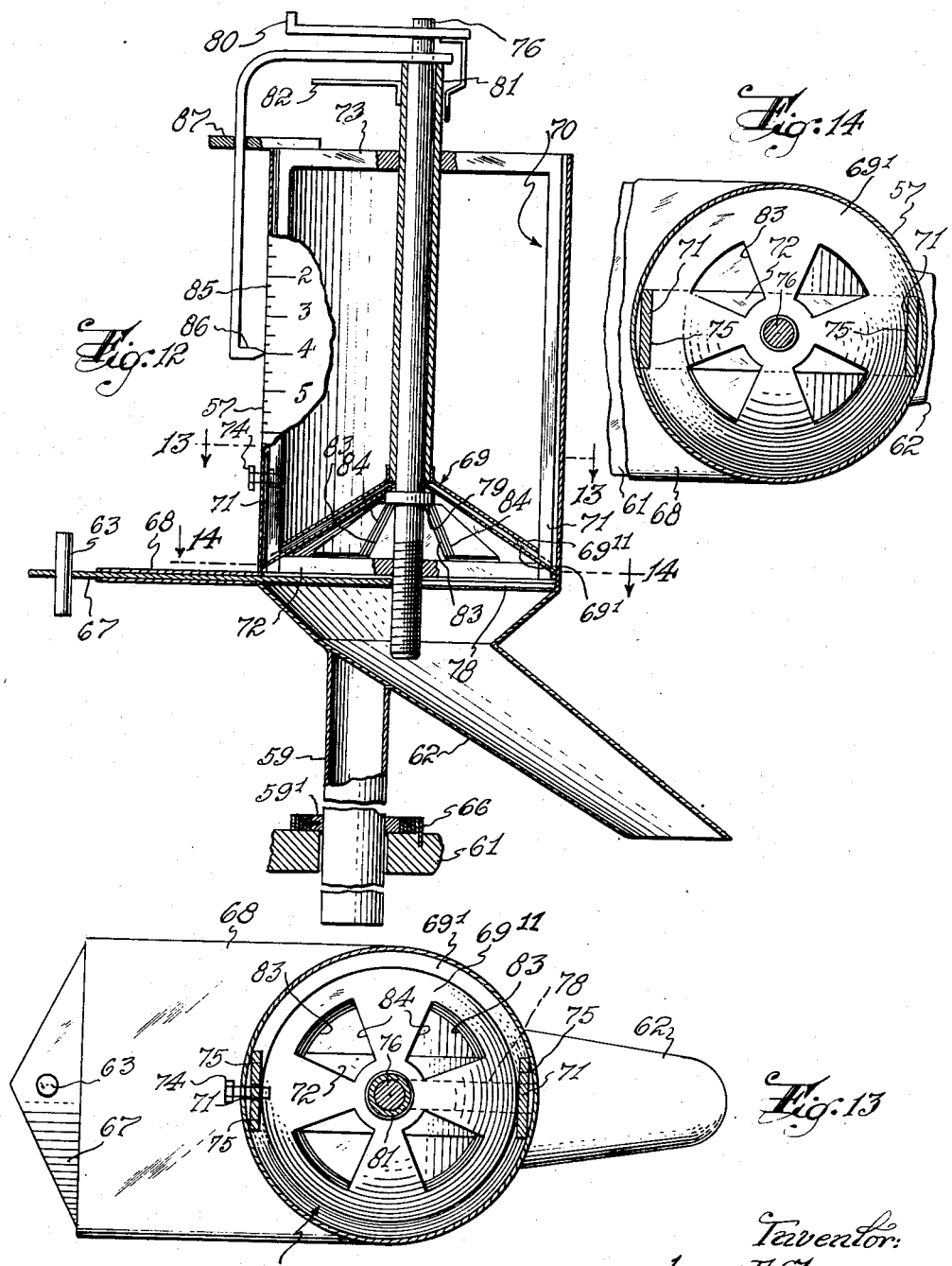

Patented Apr. 27, 1954

2,676,357

UNITED STATES PATENT OFFICE 2,676,357

PLASTIC MOLDING CONVERSION ATTACHMENT FOR RECIPROCATING PRESSES

James F. Shannon, Boonton, N. J.

Application February 28, 1952, Serial No. 273,919

9 Claims. (Cl. 18—30)

The invention relates to plastic molding machinery and has particular reference to equipment for molding plastics by the injection method.

In the plastic industry and particularly in experimental laboratory work where a regular molding machine may not be available or suited for certain experiments, there is a need for improvised molding apparatus which can be set up quickly and at low expense. Therefore, it is my primary object to provide the industry with a small, compact and inexpensive conversion unit which is capable of being attached removably to any one of the conventional reciprocating presses that may be at hand or readily procurable at low cost to convert the press into a complete molding machine.

To be more explicit, I propose to provide a conversion molding attachment which will utilize the standard platen of the press as the mold platen of the completed molding machine and which will also utilize the tie rods that customarily unite the press base with the head thereof, as supporting and guiding means, respectively, for the immobile and mobile elements of the conversion unit. Furthermore, it is my purpose to make the attaching means for the conversion unit of such construction that they may be laterally applied to or detached from the press tie rods without necessitating alteration of any parts of the press or removal of the press head.

Another object is to provide resilient reaction means interposed between the press platen and tie rods for imparting positive adhesion-breaking motion to the mold platen immediately upon release of the latter for retraction into mold-open position. Otherwise, the platen action, which normally depends upon the force of gravity alone, would be too slow.

Aside from adaptation of the conversion unit to operative combination with a conventional press, it is also my object to provide a unit of this nature wherein the holder for the heating chamber is of such construction that it may be opened up to permit cleaning of the chamber and nozzle or to permit quick lateral interchange of heating chambers or heating elements without any disassembling of other parts of the unit. This feature is of particular advantage when it becomes necessary to substitute a heating chamber of one metallic composition for one of another when changing plastics. For example, a steel heating chamber in use in connection with certain ordinary plastics may have to be replaced by a hasteloy chamber when changing over to molding of nylon. Another advantage is in permitting quick replacement of a burned out heating element or in substituting one of different electrical characteristics.

Another object of the invention is to provide an improved nozzle for the conversion unit which is so constructed and arranged with relation to the inner end of the heating chamber of said unit that a perfect liquid seal is produced at the juncture of these parts.

A further object is to provide a nozzzle which is constructed and arranged to engage each mold proper that may be mounted on the mold platen of the conversion unit as a whole in a manner to effect precise self-centering of said mold.

Another object is to provide an improved ejection plunger for the molding unit which has integral means for utilizing the extremely high pressure progressively applied to the plastic charge in the heating chamber and mold proper by said plunger to tighten and thereby seal the frictional bearing joint between the inner end of the plunger and the cylindrical wall of the heating chamber in which the former reciprocates toward and away from the nozzle.

A further object is to provide improved and highly effective packing means for the ejection plunger within the pressure cylinder in which it is operated whereby the pressure developed within the cylinder will tend to tighten the packing in its bearing relation to the opposed surfaces of the plunger and cylinder.

It is also an object of the invention to provide novel non-clogging plunger scraping means at the open end of the pressure cylinder which operates the ejection plunger to remove the adhering plastic film from the latter during each retraction stroke of the plunger, thereby preventing penetration of the cylinder by waste plastic material, and also to wipe off oil adhering to the interiorly located portion of the plunger during the downward working stroke.

A still further object is to provide an improved material feed assembly for the conversion molding unit which includes means for accurately measuring the successive charges of plastic material while in an unmelted state and for effectively insulating said charges from the heat of the heating chamber prior to admission thereto.

The above and other objects, features and advantages of the present invention will be more fully understood from the following description considered in connection with the accompanying illustrative drawings, wherein:

Fig. 1 is a front elevation partly in section of one embodiment of the invention applied to a vertical hydraulic press of well known design, showing the platen in mold-clamping position but omitting the material feed assembly; Fig. 2 is a vertical cross-sectional view on line 2—2 of Fig. 1, but showing the parts in mold-retracted or open condition; Fig. 3 is a fragmentary side elevation of the lower portion of the press to show the material heating and extrusion assembly and platen reaction device in the condition represented in Fig. 2, the reaction device being partly in section; Fig. 4 is an enlarged fragmentary view of the upper portion of the press, showing the ejection assembly and material heating and extrusion assembly in vertical section in the condition represented in Fig. 1; Fig. 5 is a horizontal cross-sectional view on line 5—5 of Fig. 1; Fig. 6 is a similar view on line 6—6 of Fig. 2, but showing the hopper and delivery spout of the material feed assembly in retracted position; and Fig. 7 is a detail plan view of the base plate of the reaction device.

Fig. 8 is a fragmentary front elevation of the press showing a modified form of the invention, partly in section, applied thereto and represented in mold-clamping condition; Fig. 9 is a horizontal section on line 9—9 of Fig. 8; Fig. 10 is a similar view on line 10—10 of Fig. 8; and Fig. 11 is a vertical section on line 11—11 of Fig. 10.

Fig. 12 is a large-scale fragmentary vertical cross-sectional view of the material feed assembly, showing the rotary measuring valve in open condition and the dispensing slide valve closed; Fig. 13 is a horizontal section on line 13—13 of Fig. 12; and Fig. 14 is a similar view on line 14—14 of Fig. 12.

Before proceeding to describe the structural details of the invention, it is desired to make it clear that it is within the scope thereof to embody its principles in various appropriate classes of molding machines, such as injection, extrusion, plunger transfer, and the like. Although, for the purpose of illustrating a useful application of the invention, I have chosen the injection molding embodiment, it is not intended to be restricted to that specific application.

Referring now in detail to the illustrative disclosure in the accompanying drawings, wherein like reference characters designate corresponding parts in the several views, Figs. 1 to 7, inclusive, and 12 to 14, inclusive, show one embodiment of the invention as applied to a hydraulic press of well known design.

While the invention is somewhat better suited to incorporation with a vertical press, i. e. one in which the direction of movement of the platen is vertical, only slight changes in the conversion molding unit will be required to adapt it to a press of the horizontal type. It is to be understood, therefore, that the scope of the combination is intended to embrace any press that has a base connected to a head by parallel tie rods and includes a movable platen arranged to reciprocate lengthwise of said tie rods. Moreover, it is immaterial as to what particular power means is employed for impelling the platen in its rectilinear path of movement along the tie rods.

By making the conversion molding unit as compact as practicable, it should fit in almost all usual types of presses, subject of course to specific adaptation of the centering and securing means to the diameter and spacing of the tie rods, which will be understood more clearly as the description progresses.

It will be noted in Figs. 1, 2 and 3 in particular that the press which is to be converted temporarily at least into an injection molding machine comprises in general a base B, a head H, a pair of parallel tie rods T—T connecting the head rigidly to the base, and a movable platen P which is guided in rectilinear movement toward and away from the head by the tie rods. The means for impelling platen P in its path of movement may be the hydraulic ram R shown, but it is to be understood that any other suitable type of prime mover, whether directly or indirectly connected to the platen, may be employed within the scope of the invention. It is also immaterial whether the ram or other impelling device be single-acting or double-acting. In a vertical press, a single-acting ram usually is used because of simplicity and reduced cost, the force of gravity being depended upon for platen retraction. Furthermore, any suitable control means (not shown) for the impelling device may be employed. In fact, the control means for the injection assembly of the conversion molding unit has not been disclosed completely because of the availability of numerous well known devices for this purpose. I am making no claim to invention of any particular control element.

Referring now to the embodiment of my invention disclosed in Figs. 1 to 7, it will be observed that the conversion molding unit is made up of six principal structural components, e. g. (1) material heating and extrusion assembly 11, (2) material feed assembly 12, (3) ejection assembly 13, (4) mold platen reaction device 14, (5) fit-determining and securing means 15 for said assembly 11, and (6) fit-determining and securing means 16 for said assembly 13.

Material heating assembly 11 comprises nozzle holding block 17 in which injection nozzle 18 is removably and adjustably screw-threaded, heating chamber 19, electric heating element 20 surrounding said chamber 19, and electrical insulation sleeve 21 encasing said heating element, which is connected with a suitable source of electric current (not shown) by conductors 20'—20''. Heating chamber 19, heating element 20 and insulation sleeve 21 are conveniently of concentric tubular form and, as a unit, are seated in a socket 17' in nozzle holding block 17.

The problem of applying the material heating assembly to the selected type of press in such a manner that the injection nozzle will be opposed to the mold platen in appropriately positioned relation has led to the invention of fit-determining and securing means which will now be described.

In operation of the completed molding machine, there will be limited movement of material heating assembly 11 in the path of rectilinear movement of the mold platen P along the parallel tie rods T—T so I have utilized said rods as supports and guides for the fit-determining and securing means 15, which is shown in detail in Figs. 1, 2, 3 and 5. This means preferably is in the form of a crosshead yoke which, when engaged operatively with tie rods T—T, bridges the gap between them in overlying relation to mold platen P. It being an object of my invention to provide for quick interchange of heating chambers whenever change-over to a particular plastic material requiring a heating chamber of different metallic composition becomes necessary, as well as for quick lateral attachment and detachment of material heating and extrusion assembly 11 with respect to the press, I have divided crosshead yoke 15 longitudinally on a vertical plane into separable sections 15' and 15". These sections are provided terminally in their abutting faces with semi-circular fit-determining and bearing recesses 22—23 to slidably embrace tie rods T—T. Suitable means, such as bolts 24, may be employed to secure sections 15'—15" of crosshead yoke 15 detachably in applied position on the supporting and guiding tie rods T—T for sliding movement thereon. Due to this split-yoke feature, installation and removal from the press may be accomplished by lateral movement of the respective sections 15' and 15" without having to remove press head H.

Referring particularly to Figs. 1 and 5, it will be observed that material heating and extrusion assembly 11 has been mounted removably in crosshead yoke 15 in such manner that detachment and separation of the component yoke sections 15' and 15" is all that is required to permit instant lateral withdrawal of one assembly and substitution of another. Both yoke sections are provided medially with registering internal semi-circular socket sections 25 and 26 designed to fit the periphery of nozzle holding block 17 of material heating and extrusion assembly 11. To support the weight of said assembly 11, suitable provision must be made. I prefer for this purpose to provide the periphery of block 17 and the abutting inner faces of socket sections 25 and 26 with an interlocking groove-and-flange structure 27.

In order to resist dislodging upward thrust on heating chamber 19 when injection nozzle 18 is screwed into block 17, suitable abutment means, such as the flange-and-shoulder arrangement 28, has been provided where said chamber 19 protrudes from the top of crosshead yoke 15.

Because the working pressure exerted on the heated plastic charge in heating chamber 19 may be as high as 20,000 pounds per square inch, I have provided a novel metal-to-metal biting joint between injection nozzle 18 and the lower end of said heating chamber. This is accomplished by providing nozzle 18 with a tapered face 18' for engagement with the sharp inner edge 19' of the lower end of chamber 19.

In order to limit upward movement of crosshead yoke 15 and its supported material heating assembly 11 under the thrust of mold platen P in practical operation when a mold M is in position on said platen, split clamping stop rings 29—29 may be applied laterally to tie rods T—T at carefully predetermined positions in relation to the top closed position of mold platen P.

To facilitate precise registration of injection nozzle 18 of the material heating and extrusion assembly 11 with the sprue of any mold M which may be slightly off-center on mold platen P, I have given the end of said nozzle 18 a rounded taper in shape and propose that each mold shall have a tapered socket 30 in its upper face concentric to sprue S. Due to this feature, as the mold closes on the nozzle, the respective male and female tapered surfaces will effect automatic centering of the mold on the platen.

Turning now to Figs. 1, 2 and 4, it will be noted that ejection assembly 13 is supported at its appropriate location above the open beveled mouth 31 of heating chamber 19 of material heating assembly 11 by fit-determining and securing means 16, which preferably takes the form of a crosshead yoke having terminal clamps 32—32 having opposed fit-determining recesses (not shown) for clamping engagement with tie rods T—T at a suitable location below press head H. Crosshead yoke 16 may be affixed to the pressure cylinder 33 of ejection assembly 13 by means of a medially located socket in which said cylinder is tightly fitted. A simple pressed-joint sufficient to support the weight of the ejection assembly will be permissible provided pressure cylinder 33 is of such length that its upper end may abut press head H.

The conventional double-acting ejection assembly has an ejection plunger 34 mounted for reciprocation in pressure cylinder 33 and hydraulic pressure controlling means (not shown) for admitting fluid under pressure alternately into the upper and lower ends of said cylinder through ports 35 and 36, respectively. Ejection plunger 34 has a piston head 34' at its upper end which imparts reciprocation to said plunger under the influence of fluid pressure alternately against its upper and lower faces at the will of the operator.

The construction and installed arrangement of ejection assembly 13 are such that plunger 34 will enter and penetrate mouth 31 of the bore of heating chamber 19 of material heating and extrusion assembly 11 to an extent of stroke sufficient to eject a charge of heated plastic material from said chamber into the interior of mold M through nozzle 18.

A packing gland 37 is provided at the lower end of pressure cylinder 33. However, this particular packing gland differs from the usual type in the addition of a novel device for scraping off the film of still soft plastic material which has adhered to ejection plunger 34 after return from each downward ejection stroke and for wiping oil of the hydraulic pressure system from the plunger during the said ejection stroke. This device preferably comprises a scraper-wiper ring 38 of hard fiber or other suitable material which is mounted in an annular socket 39 formed in the bottom face of gland 37. The oil wiping function will be improved if the upper portion of ring 38 be made of felt or other fabric. In cross-section, scraper-wiper ring 38 preferably has the form of an isosceles trapezoid so as to present a pair of sharp oppositely facing reversible scraping or wiping edges. An annular clamping nut 40 encircles ejection plunger 34 and has screw-threaded engagement with socket 39. Due to the specific cross-sectional configuration of scraper-wiper ring 38 and to the fact that nut 40 is provided with an upper face beveled to bear evenly against the lower face of said wiper ring, the act of tightening said nut will cause ring 38 to be wedged into tight contact with plunger 34. In order to provide for working projection of the free lower edge of wiper ring 38 and to permit evacuation of scrapings exteriorly of packing gland 37, the internal diameter of clamping nut 40 has been made sufficiently greater than the external diameter of ejection plunger 34 to afford the necessary clearance and thus an evacuation channel 41. To provide for disposal of oil wiped off plunger 34, an annular groove 37' has been provided in the inner periphery of gland 37 above ring 38 and an evacuation duct 37" leads from groove 37' through the outer periphery of the gland.

Another improved feature which has been added to ejection assembly 13 is the provision of pressure-tightened packing washers for piston 34' and for packing gland 37. As shown in Fig. 4, piston 34' comprises a ring 42 and a nut 43 of smaller diameter which is threaded onto the upper end of ejection plunger 34. The exposed top surface of ring 42 and nut 43 unite to constitute the effective working face of the piston head as a whole. Between ring 42 and a shoulder 44 provided on plunger 34 there are a suitable number of washers 45. These washers are preferably of a special dished shape, as shown, and at least one substantially axial pressure transmission passage 46 is provided by perforation of ring 42, so that fluid under pressure during the downstroke of the piston and plunger will enter the space occupied by washers 45 and will tend to flatten them sufficiently to exert tight fluid-sealing contact against the opposed surfaces of pistonhead and cylinder.

The same feature has been incorporated in packing gland 37 by providing a substantially axially perforate ring 47 above a number of dished washers 48 and in exposed relation to the interior of pressure cylinder 33. Conversely to the action of the piston packing device, fluid pressure during the upstroke of ejection plunger 34 will tighten the washers 48 against the opposed surfaces of plunger and packing gland.

A still further improvement has been made in the ejection assembly 13 to effect a better fluid seal between plunger 34 and the interior surface of heating chamber 19 of material heating and extrusion assembly 11 while said plunger is engaged with said chamber during each downward ejection stroke. This feature is the provision of a very thin peripheral skirt 49 of tapered cross-section on the lower end of ejection plunger 34. This skirt 49 is integral with plunger 34 and thus is metallic in composition. By carefully determining the correct thickness, taper and extent of axial projection, skirt 49 may be made to function in the intended manner within the elastic limit of the metal of which it is constructed so as to return to its original shape after each stroke. As a result, during the plunger's down-stroke and while the pressure in the bore of heating chamber 19 is building up to its 20,000 p. s. i. peak, the skirt 49 will be expanded radially by the increasing pressure into increasingly tighter frictional contact with the chamber wall. The progressively tightening fluid sealing action thus produced is a very important improvement in the ejection efficiency.

Since it is likely that a vertical hydraulic press will have a single-acting ram for its platen P, the gravity return of the latter from closed position will be objectionably slow for effective functioning in breaking the adhesion between mold and nozzle. Therefore, I have provided a resilient reaction device 14 to be interposed between the mold platen P of the press and the guide means for the material heating and extrusion assembly, which guide means are the tie rods T—T of the press. Referring now to Figs. 1, 2, 3 and 7, it will be observed that the resilient reaction device which I prefer to employ in adaptation to a press of the selected type comprises two separate units, one for each tie rod T. Each unit has an elongated base plate 50, a matching top plate 51, and a pair of spiral compression springs 52—52 interposed between the end portions of both of said plates. The ends of the springs preferably are sunk in sockets 50'—51' provided in the respective plates 50—51. To permit lateral installation and removal, the respective plates 50 and 51 are divided into end sections 50"—51" having semicircular recesses 53—53 and 54—54 in their meeting edges dimensioned to fit the corresponding tie rod T. The composite recess in plate 50 is of a diameter to fit slidably on the tie rod and suitable clamping means 55 are provided to secure the plate sections 50"—50" together without binding action on the tie rod. On the contrary, the composite recess in plate 51 is of a diameter to fit the tie rod fixedly when the clamping means 56 for the sections 51"—51" are tightened.

The length of each spring 52 should be such that, when mold platen P is in its closed position shown in Fig. 1, with mold M in operative engagement with nozzle 18 of material heating and extrusion assembly 11 and with crosshead yoke 15 driven up against stop rings 29—29, the tension of said springs will be sufficient to impart a strong positive downward thrust to mold platen P and the supported mold M at the end of each molding cycle as the pressure in ram R is released by the operator. Conversely, during each mold closing operation of platen P, the resistance of springs 29—29 of the reaction device to the ram's upthrust will serve to afford automatic slow-down prior to mold contact and thereby eliminate die slam.

The position of top plates 51—51 of both reaction device units should be such that, when mold platen P is in its lowered open position shown in Fig. 2, crosshead yoke 15 will rest upon said top plates 51—51 in a position wherein the mouth 31 of heating chamber 19 of material heating and extrusion assembly 11 will be separated to a considerable distance downward from the protruding end of retracted ejection plunger 34 of ejection assembly 13. This space between plunger and heating chamber mouth is required at the stage in each molding cycle shown in Fig. 2 when a fresh charge of plastic material is to be delivered to said heating chamber by the material feed assembly to be described in complete detail at this time.

Turning now to Figs. 2 and 12 through 14, the material feed assembly 12 which I have devised for cooperation with the material heating and extrusion assembly will be observed to include a hopper 57, which is mounted on one side of pressure cylinder 33 of ejection assembly 13 for limited vertical sliding movement and oscillation on a vertical axis by a simple embracing band 58. To support the weight of hopper 57 and contents, a pintle 59 depending from said hopper in prolongation of its pivotal axis is journaled in a socket 60 provided in a table 61 which is permanently supported by the upper end of heating chamber 19. A collar 59' provided on pintle 59 bears directly upon the upper face of table 61. By constructing table 61 of heat-insulation material, the heat from chamber 19 cannot penetrate the walls of hopper 57 to melt the plastic material therein prematurely and thus interfere with free flow therefrom at the required time.

A sloping delivery spout 62 in communication with the bottom of hopper 57 extends downward to a level below that of the lower end of ejection plunger 34 of ejection assembly 13 and has sufficient lateral projection from the axis of oscillation to move in a path overlying the mouth 31 of heating chamber 19 so that it may register with said mouth when the hopper is turned into the feeding position shown in Fig. 2. A handle 63, which will be described in greater detail presently, is provided on hopper 57 for use by the operator in moving spout 62 into feeding position. Oscillation limiting stops 64 and 65 are provided on table 61 for contact with spout 62 in feeding and retracted positions, respectively. Automatic retraction of the hopper spout 62 to a position clear of the thrust path of plunger 34 of ejection assembly 13, upon manual release of handle 63, is effected by suitable means, such as convolute retracting spring 66, which preferably rests on table 61 in encompassing relation to flange 59' with its ends affixed to pintle 59 and said table, respectively. Retracting spring 66 is arranged to be under tension when hopper spout 62 is in feeding position. A centrally perforated cover cap 66' for spring 66 has been mounted on pintle 59 to shield said spring against being clogged by accidental overflow of plastic material when hopper 57 is being filled.

Hopper 57 preferably is cylindrical in form. At the plane of juncture with tapering delivery spout 62, a horizontally disposed dispensing slide valve 67 is mounted in a laterally projecting radially directed slideway 68. In its inwardly thrust position shown, the bottom of hopper 57 is completely shut off from delivery spout 62. Handle 63, previously mentioned, is affixed to the outer end of dispensing valve 67. Consequently, this single handle serves two purposes, e. g. to oscillate hopper 57 and spout 62 and also to open and shut dispensing valve 67.

A charge measuring valve 69 is positioned in hopper 57 at a regulable distance above dispensing valve 67. This valve 69 is composed of two frusto-conical, centrally perforate, cooperative members 69'—69''. The lower member 69' is nearly equal in skirt diameter to the internal side wall diameter of hopper 57. The difference is just enough to permit member 69' to slide axially in hopper 57 but affords a joint sufficiently close to prevent leakage of plastic material from the principal interior space of the hopper into the small measuring space below said member 69'. In order to prevent rotary displacement of valve member 69', a rectangular frame 70, whose side bars 71—71, bottom crossbar 72 and top crossbar 73 are all disposed substantially in a diametrical plane, is mounted inside hopper 57. A locking pin 74 is provided in piercing relation to the side wall of hopper 57 and one side bar 71 of frame 70 to secure said frame against displacement from its intended position. Member 69' of measuring valve 69 is provided with side notches 75 to receive and slidably bear against side bars 71—71 of frame 70. Valve member 69' is thus restricted to vertical sliding movement only.

A centrally arranged adjusting rod 76 extends axially in hopper 57 and through the central perforations of both members 69' and 69'' of measuring valve 69 with its lower end in screw-threaded engagement with bottom crossbar 72 of frame 70. The inner end portion of dispensing valve 67 is provided with a slot 78 to straddle adjusting rod 76 when the said valve is operated. By arranging frame 70 so that supporting bar 72 extends lengthwise of slideway 68, slot 78 will be closed when the dispensing valve is closed, so that there will be no gap in the bottom closure. A collar 79 is provided on adjusting rod 76 to support lower member 69' of measuring valve 69. Consequently, the height of said measuring valve and the volume of the space between the same and the dispensing valve 67 may be regulated by manual rotation of adjusting rod 76. For this purpose, a handle 80 is provided on the exteriorly protruding upper end of rod 76.

Upper member 69'' of measuring valve 69 has a skirt diameter nearly equal to the distance between side bars 71 of frame 70 so that it may slide axially and also rotate freely within hopper 57. The central aperture in upper valve member 69'' is sufficiently larger than the diameter of adjusting rod 76 to fit the lower end of a sleeve 81 which is slidable and rotatable on said adjusting rod. Upper valve member 69'' is affixed to sleeve 81 so that it may be rotated manually relative to lower valve member 69' by means of exteriorly disposed handle 82 provided near the upper end of said sleeve exteriorly of hopper 57. Lower and upper valve members 69' and 69'' are provided respectively with preferably segmental ports 83 and 84 which are equal in area but narrower than the intervening solid portions of said valve members, whereby the valve 69 as a whole may be closed by a partial rotation of upper member 69''. The angle of slope of valve members 69' and 69'' corresponds to the angle of repose of the particular pulverulent or granular plastic material to be handled. Due to this feature, the cone of plastic material as it piles up in the measuring space beneath measuring valve 69 will completely fill the areas directly beneath the solid portions of said valve up to the level of the upper edges of ports 83 in lower valve member 69'.

In order that a measured number of charges of plastic material may be admitted to hopper 57 through its open top for a planned number of molding cycles, a suitable scale of measurement 85 is delineated on the exterior surface of the side wall of the hopper and a pointer 86 pivotally engaged with the upper end of adjusting rod 76 and supported by sleeve 81 is disposed to traverse said scale 85 as rod 76 is adjusted vertically by manipulation of handle 80. A stationary guide member 87 projecting laterally from the upper end of hopper 57 serves to maintain registration of pointer 86 with scale 85 regardless of rotation of adjusting rod 76.

From the foregoing description, the manner of installing the conversion molding unit in a press to produce a complete molding machine should be understood without further explanation. However, the mode of operation of the machine will now be described.

The machine is first conditioned for operation by insuring that the mold platen P, material heating and extrusion assembly 11, and the ejection plunger 34 of ejection assembly 13 are in the mold-open positions represented in Fig. 2, by turning on the electric current for heating element 20, by supplying the required quantity of solid plastic material for the planned number of successive molding charges to hopper 57 of material feed assembly 12, and by setting measuring valve 69 for the correct charge volume and then operating said valve to drop the initial charge into the measuring space above dispensing valve 67.

When the heating chamber is at the required temperature for melting the initial plastic charge, the mold M is placed on mold platen P in a position adjudged by visual inspection to be properly centered. The machine is now ready for an operational run of successive molding cycles.

The first operation in the initial cycle is to feed a charge of solid plastic material to heating chamber 19. This is done by first oscillating handle 63 of the material feed assembly against the tension of its automatic retracting spring in clockwise direction (Fig. 6) to bring delivery spout 62 into registration with mouth 31 of heating chamber 19. This is a simple, free motion, because stop 64 precisely determines the limit of movement into feeding position. Now, while the spout is retained in this position, handle 63 is pulled out to open dispensing slide valve 67, care being taken not to disturb the angular setting of the handle. When the initial charge has gravitated through spout 62 into heating chamber 19, handle 63 is shoved back into valve closing position and is released, whereupon spring 66 automatically retracts delivery spout 62 to inoperative position clear of the mouth of heating chamber 19 and of the path of movement of ejection plunger 34.

As the next succeeding operation in the initial cycle, mold platen P is driven upward into closed relation to material heating and extrusion assembly 11 by manipulation of the conventional control means for hydraulic ram R. During this mold-closing step, tapered nozzle 18 will engage tapered socket 30 in mold M in a manner to perfect the centering of said mold just before it becomes immovably clamped between platen and nozzle. At the same time, mold reaction device 14 will serve to slow down the mold-closing movement and thereby ease the impact of mold M with ejection nozzle 18 due to the progressive tensioning of springs 52—52 as the weight of assembly 11 is applied thereto and is followed by the positive resistance of stop rings 29—29.

When the charge of plastic material in heating chamber 19 has been raised to proper molding temperature, the ejection assembly is operated in the usual manner by the control means therefor to drive ejection plunger 34 downward into heating chamber 19, thereby ejecting the molten plastic charge through ejection nozzle 18 into mold M.

Following the operation just mentioned, ejection plunger 34 is retracted and the pressure in ram R is released to cause lowering of mold platen P. As has been described, gravitational retraction of mold platen P is supplemented by the automatic effect of reaction device 14, which will apply a positive downward kick to said platen through the reaction of springs 52—52. While this is happening, material heating and extrusion assembly 11 will be permitted to gravitate into the position shown in Fig. 2.

After either ejecting the hardened plastic product from mold M and re-closing it for further immediate use or replacing that mold by a different one, the next succeeding cycle of operations may be commenced.

Figs. 8 to 11 illustrate a self-contained form of conversion molding unit which depends entirely upon frictional contact and abutment of position-determining surfaces for mounting installation in properly fitted operative position between the movable platen and head of the conventional press with which it is combined to produce a complete molding machine.

In this illustrative example, a frame 88 is provided to be removably inserted between press platen P and head H. Frame 88 is primarily composed of a supplementary platen 89 adapted to bear flat against the working face of the press platen, a supplementary head plate 90 to underlie the inner face of the press head, and spacer rods 91—91 intervening between supplementary platen 89 and supplementary head plate 90. Spacer rods 91—91 are disposed at opposite sides of frame 88 to provide adequate space for insertion of a mold therebetween and have their upper ends adjustably engaged with supplementary head plate 90 in suitable manner, as by the screw-threaded connection shown. The lower ends of spacer rods 91—91 are slidably engaged with supplementary platen 89. A convenient way to effect this slidable engagement is to erect tubular guides 92—92 on supplementary platen 89 for reception of the lower ends of spacer rods 91—91.

Resilient reaction means for this modified conversion unit is provided preferably by mounting helical compression springs 93—93 in enclosing relation to the respective tubular guides 92—92 and interposed between supplementary platen 89 and collars 94—94 which are suitably affixed to spacer rods 91—91.

In the modified conversion molding unit, material heating and extrusion assembly 11 is unchanged. Crosshead yoke 15 for centering and securing said assembly 11 in frame 88 is constructed to span and slidably fit spacer rods 91—91. Stop collars 95—95 are adjustably affixed to spacer rods 91—91 above the ends of crosshead yoke 15 at locations which will appropriately limit upthrust of material heating and extrusion assembly 11 when mold platen P of the press is moved into closed position, wherein mold M operatively engages nozzle 18 of said assembly. Restraining bolts 96—96 rise from supplementary platen 89 and slidably pierce crosshead yoke 15 for the purpose of preventing accidental detachment of said supplementary platen when the conversion molding unit is pulled out of the press for any reason.

Ejection assembly 13 in this instance is identical with that shown in Figs. 1 to 7, but it is practicable to fasten the upper end of pressure cylinder 33 thereof to supplementary head plate 90 in the manner shown at 97 instead of employing a crosshead yoke to center and secure said cylinder to spacer rods 91—91.

As shown in Figs. 9 and 10, supplementary head plate 90 and supplementary platen 89 are elongated horizontally in the direction of a vertical plane intersecting spacer rods 91—91 and fastening 97. The width of supplementary platen 89 must be sufficient to accommodate all molds which may be used in the machine. The entire conversion molding unit consequently will be horizontally narrow enough for insertion from front to rear between tie rods T—T of the press when arranged in the position represented in broken lines in Fig. 9. Subsequent oscillation of the unit in the direction of the arrow will bring it into a position which will clear the way from front to rear of the press for insertion and removal of molds.

While frame 88 serves as means for securing the conversion molding unit detachably in the press, it is desirable to have added means for accurate centering of supplementary platen 89, material heating and extrusion assembly 11 and ejection assembly 13. This I have accomplished by providing tie rod-engaging jaws 98—98 on supplementary head plate 90. Jaws 98—98 have notches 99—99 which preferably are V-shaped to fit press tie rods of different diameters. To allow for varying lateral separation of the tie rods in different presses, jaws 98—98 may be made relatively adjustable in position as by pivoting them on spacer rods 91—91 to permit adjustment of notches 99—99 into precise centering engagement with tie rods T—T of the press. Suitable means for locking jaws 98—98 in adjusted positions are shown at 100—100.

After jaws 98—98 of the conversion molding unit have been adjusted to suit the inter-tie rod distance of the press, further adjustment should not be required during use in the same press although the unit may be taken out and replaced many times.

By comparison, the two illustrative embodiments of the conversion molding unit disclosed in Figs. 1 to 7 and in Figs. 8 to 11, respectively, differ principally in the structural means for fitting the unit to a selected press and for securing the unit against displacement from fitted position under normal operating conditions. For example, in the first-mentioned embodiment, clamping and bearing means embracingly engage the tie rods of the press to fixedly or slidably mount the respective immobile or mobile assemblies of the conversion unit in the press, whereas in the other embodiment fitting and securing is accomplished through the medium of a frame in which all assemblies of the unit are mounted for either mobility or immobility as the case may be. The frame is mounted in turn on the mold platen of the press in frictional displacement-resisting contact therewith and also in position-determining or fitting contact with the press tie rods. Therefore, the term "mounting means" is to be understood wherever used herein to define in a general sense all equivalent means for "attaching," or "centering and securing," or "fitting and securing," the unit assemblies either separately or collectively in the press structure by engagement with suitably positioned elements of the latter. It is to be understood further that by "engagement" is meant either embracing attachment or frictional contact and abutment of a character which is sufficient to resist displacement from fitted position. Returning now to consideration of the Figs. 1 to 7 embodiment of the conversion unit, the mounting means for the material heating and extrusion assembly 11 is crosshead yoke 15, which embracingly engages tie rods T—T of the press slidably, and the mounting means for ejection assembly 13 is crosshead yoke 16, which embracingly engages said tie rods fixedly. In the other embodiment of Figs. 8 to 11, unitary mounting means is provided for both of the assemblies 11 and 13 and takes the form of frame 88 which frictionally engages moving platen P of the press and abuttingly engages tie rods T—T.

It will be understood that it is intended to cover all changes and modifications of the examples of the invention herein chosen for the purpose of illustration which do not constitute departures from the spirit and scope of the invention.

Having thus described the invention, I claim:

1. The combination with a press having a base, a head, parallel tie rods connecting the base and head, a platen reciprocable along the tie rods, and controllable operating means for the platen, of a conversion plastic molding unit adapted to fit removably in the space between the head and platen of the press, said conversion molding unit comprising: a mounting frame including a supplementary platen to serve as the mold platen adapted to bear frictionally upon the press platen; a supplementary head; parallel spacer rods extending between the supplementary platen and supplementary head in fixed relation to said head and in sliding relation to said platen; stop means on said spacer rods; resilient reaction means interposed between said stop means and the supplementary platen; and press fit-determining means provided on the supplementary platen and supplementary head for lateral abutment against the tie rods of the press; a material heating and extrusion assembly having a heating chamber and a nozzle communicating therewith; a crosshead yoke spanning the spacer rods of the mounting frame in slidable engagement therewith and supporting the material heating and extrusion assembly for movement toward and away from the supplementary platen with the nozzle facing said platen for mold registration; material ejection means operatively associated with the material heating and extrusion assembly; and means for supporting said material ejection means in the mounting frame.

2. The combination press and conversion molding unit as defined in claim 1, wherein the fit-determining means of the mounting frame are disposed at opposite sides thereof adjacent to the spacer rods and present portions which face in opposite directions circumferentially about the axis of movement of the material heating and extrusion assembly for lateral abutment against the tie rods of the press when the mounting frame is rotated partially after insertion between said tie rods.

3. The combination press and conversion molding unit as defined in claim 2, wherein the fit-determining means of the mounting frame includes jaws having V-shaped notches adapted to engage the press tie rods.

4. The combination press and conversion molding unit as defined in claim 3, wherein the jaws of the fit-determining means are adjustable radially with respect to the axis of movement of the material heating and extrusion assembly for accommodation to press tie rods of variable spacing.

5. As an article of separate manufacture, a conversion plastic molding unit for removable installation in a press having a head, parallel tie rods rigid with the head, and a platen slidable on said tie rods to produce a complete molding machine comprising: a material heating and extrusion assembly having a heating chamber and a nozzle communicating therewith; material ejection means operatively associated with said heating chamber; and mounting means for the material heating and extrusion assembly and ejection means being in the form of a frame including a supplementary platen adapted to bear frictionally upon the press platen; a supplementary head; parallel spacer rods extending between the supplementary platen and supplementary head in fixed relation to said supplementary head and in sliding relation to said supplementary platen; stop means on said spacer rods; resilient reaction means interposed between said stop means and the supplementary platen; a crosshead yoke spanning the spacer rods in slidable engagement therewith and supporting the material heating and extrusion assembly for movement toward and away from the supplementary platen with the nozzle facing said supplementary platen for mold registration; means for supporting the material ejection means in the frame; and press fit-determining means provided on the supplementary platen and supplementary head for lateral abutment against the tie rods of the press.

6. In a plastic molding machine, the combination of: a frame including parallel tie rods; a material heating and extrusion assembly including a heating chamber, a nozzle block enclosing said heating chamber, and an extrusion nozzle supported by said nozzle block in communication with the interior of the heating chamber; and means to mount the material heating and extrusion assembly removably in the frame comprising a split crosshead yoke having opposed sections terminally engaged with the tie rods of said frame and provided medially with registering internally facing socket sections embracingly fitting the external side faces of the nozzle block of the material heating and extrusion assembly, and means to clamp the sections of the crosshead yoke together in gripping engagement with said nozzle block.

7. In a plastic molding machine, the means for mounting the material heating and extrusion assembly in the frame, as defined in claim 6, wherein the abutting side faces of the nozzle block and crosshead yoke recess sections are cylindrical in form and provided with a thrust resisting annularly arranged interlocking groove-and-flange structure.

8. In a plastic molding machine, a vertically disposed material heating chamber having a filling mouth in its upper end, a material feed assembly associated with said heating chamber and including a hopper having a delivery spout adapted to register with the filling mouth of the heating chamber, a table of heat insulation material mounted on said heating chamber, and means for movably mounting the feed hopper on said table to prevent conduction of heat from the chamber to the hopper.

9. In a plastic molding machine, the combination of: a frame, a mold platen movable in said frame; a material heating and extrusion assembly movable in said frame in the same path of movement as the mold platen and including an extrusion nozzle facing said platen for registration with a mold mounted thereon; retractable operating means to move the mold platen toward the material heating and extrusion assembly into mold closing position; stop means on said frame to limit movement of the material heating and extrusion assembly away from the mold platen under influence of mold closing movement of the latter; means to check reverse assembly movement during platen retraction and resilient reaction means interposed between said mold platen and the material heating and extrusion assembly to cushion mold closing movement and to cause accelerated mold opening movement upon retraction of the mold platen operating means.

References Cited in the file of this patent

UNITED STATES PATENTS

| Number | Name | Date |
|---|---|---|
| 919,917 | McDuffie | Apr. 27, 1909 |
| 1,517,932 | Sylvester | Dec. 2, 1924 |
| 1,924,474 | Wiegand et al. | Aug. 29, 1933 |
| 1,945,151 | Marsh | Jan. 30, 1934 |
| 1,974,362 | Marsh | Sept. 18, 1934 |
| 2,233,558 | Shaw | Mar. 4, 1941 |
| 2,308,867 | Dinzl | Jan. 19, 1943 |
| 2,374,468 | Von Opel | Apr. 24, 1945 |
| 2,386,891 | Gregory | Oct. 16, 1945 |
| 2,443,853 | Fall | June 22, 1948 |
| 2,490,566 | Wishart | Dec. 6, 1949 |
| 2,501,595 | Bohannon | Mar. 21, 1950 |
| 2,577,412 | Ferrell | Dec. 4, 1951 |
| 2,600,958 | Barton | June 17, 1952 |

FOREIGN PATENTS

| Number | Country | Date |
|---|---|---|
| 442,207 | Great Britain | Jan. 23, 1936 |